United States Patent [19]
White

[11] 4,252,228
[45] Feb. 24, 1981

[54] TWO-HAND MECHANICAL CONTROL DEVICE

[75] Inventor: Robert D. White, Akron, Ohio
[73] Assignee: Scovill Inc., Waterbury, Conn.
[21] Appl. No.: 28,693
[22] Filed: Apr. 10, 1979
[51] Int. Cl.³ ............................................... F16P 3/22
[52] U.S. Cl. ................................. 192/131 R; 74/521
[58] Field of Search ....................... 192/131 R; 74/521

[56] References Cited
U.S. PATENT DOCUMENTS

| | | | |
|---|---|---|---|
| 1,676,866 | 7/1928 | Maury | 74/520 |
| 2,171,559 | 9/1939 | Higley | 192/131 R |
| 2,171,568 | 9/1939 | Johnson | 192/131 R |
| 2,171,583 | 9/1939 | Malott, Jr. | 192/131 R |
| 2,215,795 | 9/1940 | Pearson et al. | 192/131 R |
| 3,605,969 | 9/1971 | Cornu et al. | 192/131 R |
| 3,728,498 | 4/1973 | Aslanbayrak et al. | 192/131 R |
| 3,815,456 | 6/1974 | Braathen et al. | 83/68 |

FOREIGN PATENT DOCUMENTS

| | | |
|---|---|---|
| 81170 | 3/1956 | Netherlands . |
| 417532 | 10/1934 | United Kingdom . |
| 813092 | 5/1959 | United Kingdom . |

*Primary Examiner*—Kenneth Downey
*Attorney, Agent, or Firm*—Price, Heneveld, Huizenga & Cooper

[57] ABSTRACT

A mechanism for controlling either momentary or maintained, continuous operation of devices such as valves, presses, machines and other devices which require simultaneous use of two hands by an operator to prevent accidents and injury. The mechanism includes a moveable linkage formed from rigid links pivotally connected in a closed polygon, preferably a parallelogram. A pair of hand-controlled plungers, which are biased to return the linkage to its rest position when released, enable movement of the linkage to momentarily or continuously operate an electrical switch, pneumatic valve or other contact control device only when both plungers are depressed simultaneously. A raised surface for guiding movement of the linkage is included to prevent unintended or single-handed operation. Constant depression of one plunger with intermittent operation of the other, or sequential operation of the plungers, will not engage the contact or control device.

23 Claims, 12 Drawing Figures

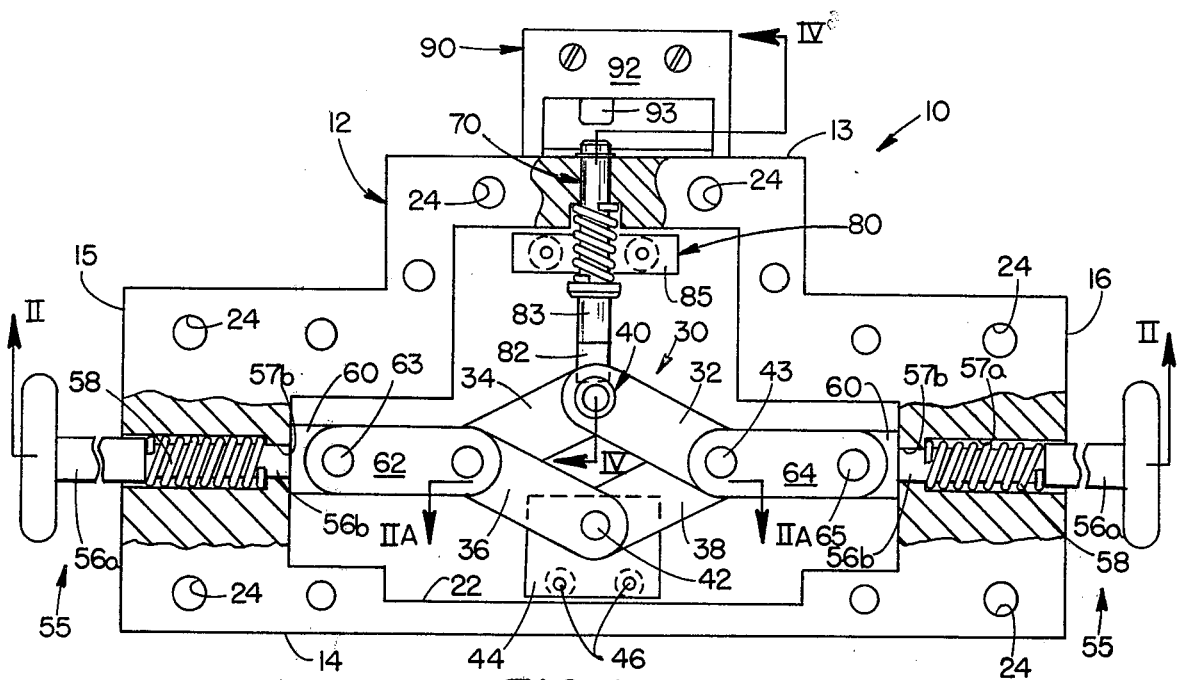
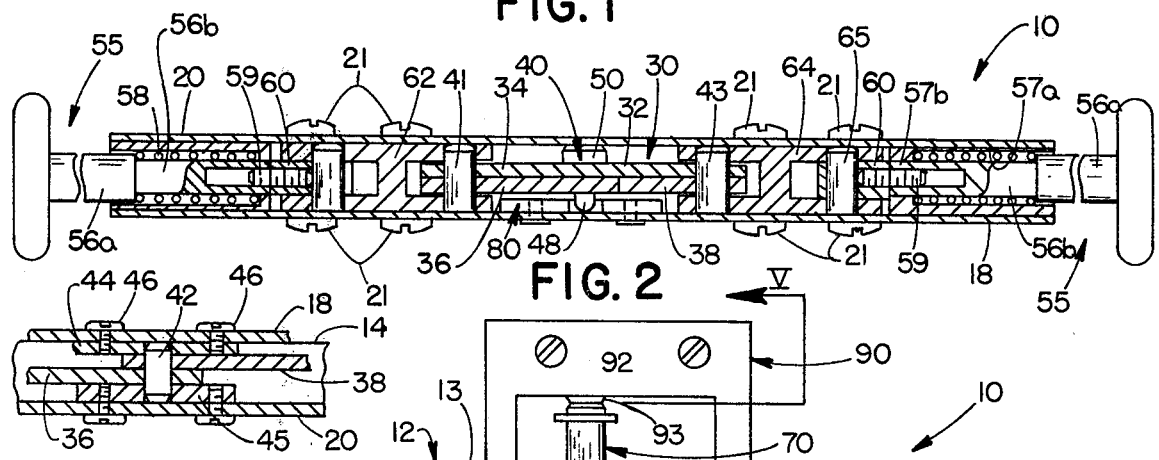
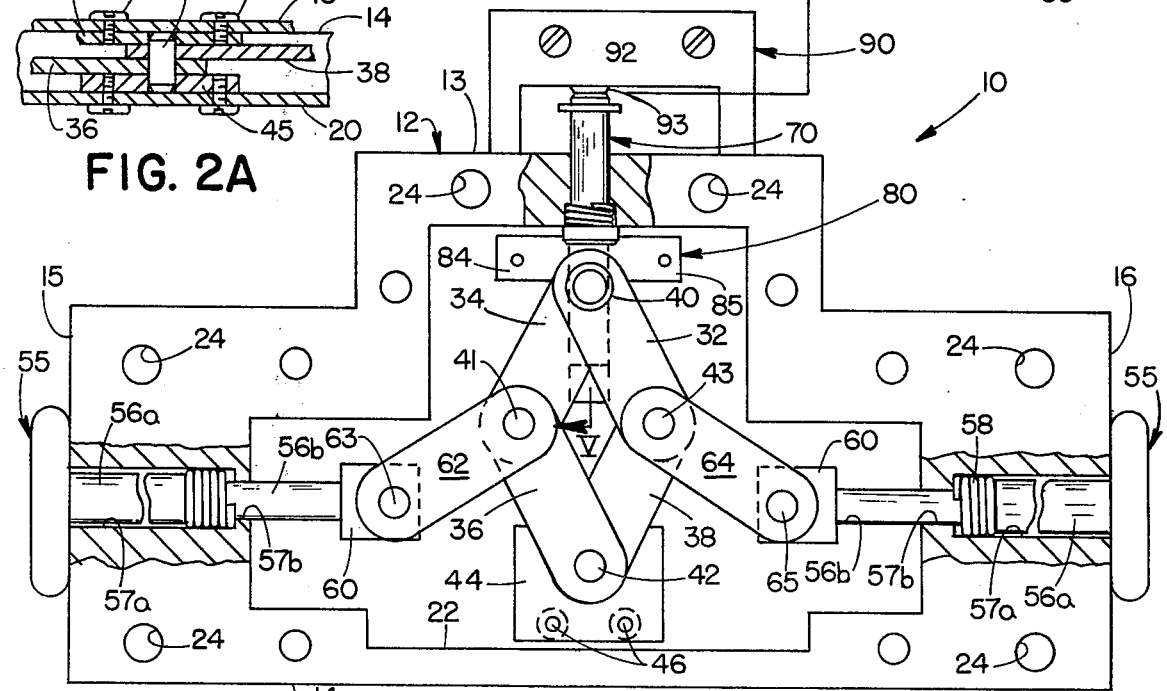

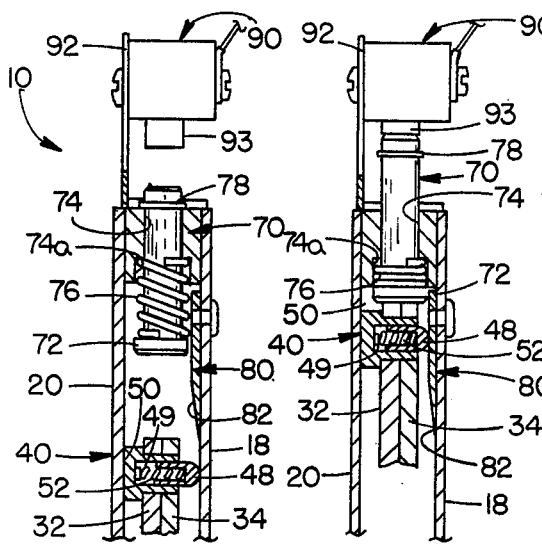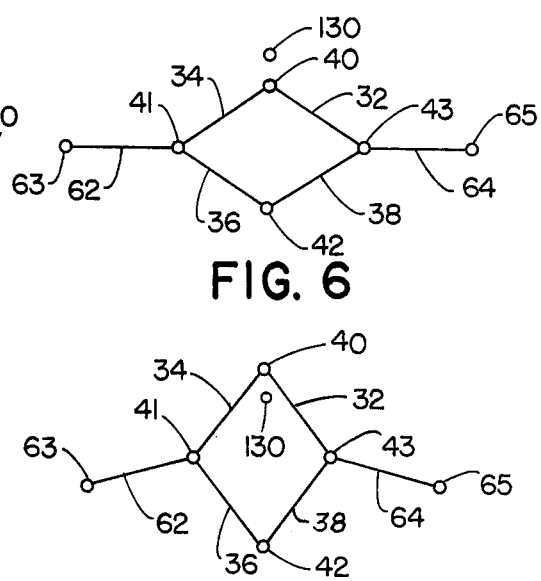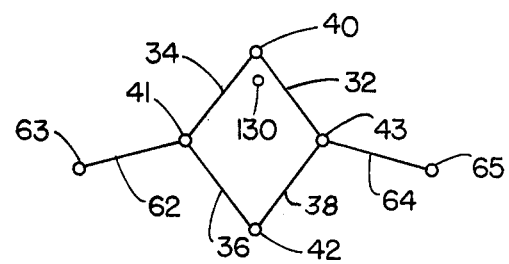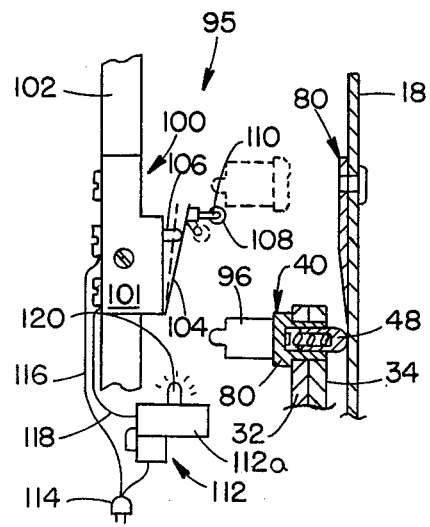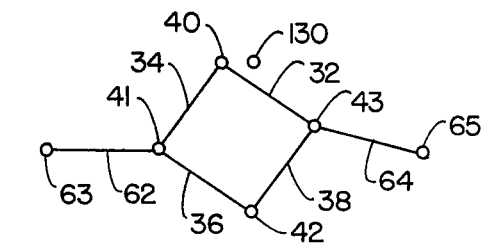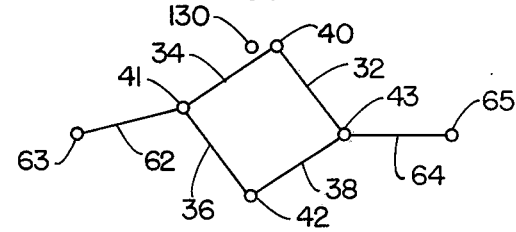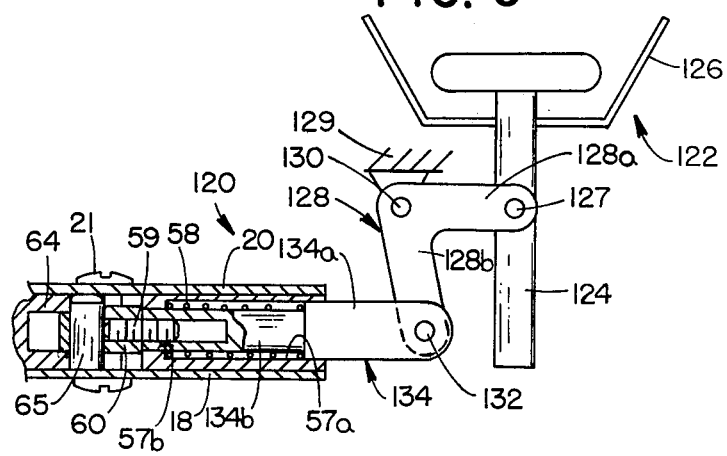

TWO-HAND MECHANICAL CONTROL DEVICE

BACKGROUND OF THE INVENTION

This invention relates to mechanisms for controlling the operation of other devices such as valves, presses or other machines and, more particularly, to a mechanism which requires simultaneous use of two hands by an operator to cause engagement of a machine control or other device.

Control devices for machines such as presses and other dangerous implements are well-known. Many devices have attempted to require simultaneous operation of a pair of levers or other operating implements in order to operate the machine. However, a principle drawback to many of the prior known controls has been the fact that one of the two operating levers or implements may be left constantly depressed or engaged while the remaining lever or implement is sequentially operated to cause operation of the machine or ultimate mechanism. This mode of operation of the prior devices defeats the entire purpose of the control mechanism which is to require an operator to use both hands to prevent one hand from being left in the pinchpoint of the controlled press or other machine thereby preventing serious injury to the operator.

Another drawback with the prior devices has been the relative difficulty in using such devices to obtain instantaneous or momentary operation of a machine such as a press. While many prior devices are sufficient to require two-hand operation for maintained or continuous machine operation, their structural limitations prevent them from being useful to require two-hand operation for only momentary operation of a machine control switch and the ultimate machine.

Exemplary of prior, two-hand control devices is the control mechanism shown in U.S. Pat. No. 2,171,559 to F. R. Higley. Higley discloses a pair of pivotally connected bell crank arms joined to a pair of links which move when the bell crank arms are depressed. However, Higley requires the use of a separate stop member interconnected with the controlled mechanism such as a clothes press or the like which must be removed before the bell crank arms can be depressed. Such interconnections provide an additional source of failure and also make the mechanism complex. Should the separate stop member fail to return to its proper position, the bell crank arms could be individually operated to cause operation of the controlled machine.

In Aslanbayrak et al. U.S. Pat. No. 3,728,498, a simultaneous, dual hand, lever control is shown which requires simultaneous movement of manual operating rods engaging a pair of bell cranks which, when lifted together, lift an entire operating mechanism. Such lifting requires considerable force and the mechanism itself is somewhat bulky making it difficult to use on different types of machines.

In Cornu et al. U.S. Pat. No. 3,605,969, a two-hand safety device includes a rotatable wheel having teeth thereon engaged by opposing rack members which are, in turn, connected to levers. The gear teeth connection of the wheels and levers may easily be worn and/or jammed causing failure in operation.

The present invention was devised as an improvement over prior control devices and as a solution to the safety problems of requiring two-hand operation of a control for either momentary or maintained, continuous operation of a machine. This invention prevents the tying down or elimination of need to operate one of the two-hand controls simultaneously. The safety objective intended by use of the two-hand control is, therefore, maintained.

SUMMARY OF THE INVENTION

Accordingly, the present invention provides a two-hand control mechanism for controlling the operation of devices such as valves, presses, machines and other devices which requires simultaneous use of two hands by an operator to prevent accidents and injury. The mechanism may be used with various devices such as electrical switches or pneumatic valves which in turn control the operation of other devices or machines such as presses. The mechanism is structured to prevent operation of the ultimate machine when the operator uses only one hand, or operates the two-hand controls sequentially or non-simultaneously. Thus, the operator cannot defeat operation of this safety device by tying down one side or one hand control to avoid the intended operation. Both hand controls must be released to reactivate the machine operation. If one hand control does not return or is not operating properly, machine operation is prevented. When the ultimate machine is being operated continuously, removal of one hand from the present invention will discontinue machine operation thereby maintaining the intended safety objective. The mechanism also enables either momentary or continuous operation of the ultimate machine but, in either case, always requires two-hand, simultaneous operation of the hand controls.

In one form, the invention is a two-hand control mechanism for accomplishing the above objectives including a linkage having a plurality of pivotally connected links forming a closed polygon. One pivot point of the linkage is secured at a first, fixed position. A first hand-controlled means is pivotally connected to the linkage at a second position spaced from the first, fixed position on one side of the linkage for moving that one side. A second hand-controlled means is pivotally connected to the linkage at a third position spaced from the first, fixed position on the side of the linkage opposite to the one side for moving that opposite side. Engaging means for engaging a contact adjacent the linkage are secured to a moveable pivot point at a fourth position on the linkage opposite the fixed point and intermediate the sides of the linkage. The contact is adapted to initiate operation of a device such as a machine. The hand-controlled means are operable simultaneously to move the linkage between rest and operative positions. The engaging means engage the contact only when the first and second hand-controlled means are operated simultaneously to move the linkage.

In a preferred form, the moveable linkage is a parallelogram having four pivotally connected, rigid links. The hand-controlled means are spring-biased plungers which return the linkage to a rest or nonextended position. A guide in the preferred form of a raised, ramp member controls movement of the engaging means to and from the contact and prevents engagement when only one hand-controlled means is operated or the hand-controlled means are not operated simultaneously. The contact may be a slideable plunger, an electrical switch, or a pneumatic valve, or a combination thereof, the switch and/or valve being ultimately connected to a machine such as a press whose operation is being controlled by the operator using the two-hand control mechanism of the present invention.

The present invention is reliable in use and prevents accidental operation of the ultimate machine because two-hand, simultaneous operation of the hand-control mechanism is required regardless of whether the ultimate machine is to be operated momentarily or continuously.

These and other objects, advantages, purposes and features of the invention will become more apparent from a study of the following description taken in conjunction with the drawings.

BRIEF DESCRIPTION OF THE DRAWINGS

FIG. 1 is a front elevation of a first embodiment of the two-hand control mechanism of the present invention with the front cover plate removed and portions broken away and illustrating the mechanism in its rest position;

FIG. 2 is a sectional plan view of the control mechanism taken along line II—II of FIG. 1;

FIG. 2A is a fragmentary, sectional plan view of the fixed point of the linkage taken along line IIA—IIA of FIG. 1;

FIG. 3 is a front elevation of the control mechanism similar to FIG. 1 but showing linkage of the mechanism in its extended position; and the hand-controls depressed;

FIG. 4 is a fragmentary, sectional, side elevation of the control mechanism in its rest position and taken along line IV—IV of FIG. 1;

FIG. 5 is a fragmentary, sectional, side elevation of the control mechanism in extended position and taken along line V—V of FIG. 3;

FIG. 6 is a schematic illustration of the preferred parallelogram linkage of the present invention shown at rest position;

FIG. 7 is a schematic illustration of the linkage of FIG. 6 when both hand-controlled devices are operated simultaneously;

FIG. 8 is a schematic illustration of the linkage of FIG. 6 when only the right, hand-controlled mechanism is operated;

FIG. 9 is a schematic illustration of the linkage of FIG. 6 when only the left, hand-controlled mechanism is operated;

FIG. 10 is a fragmentary, sectional side elevation of a second embodiment of the control mechanism of the present invention adapted for momentary operation of a controlled machine; and FIG. 11 is a fragmentary, sectional, side elevation of a third embodiment of the present invention illustrating a modified hand-depressed control plunger.

DESCRIPTION OF THE PREFERRED EMBODIMENTS

Referring now to the drawings in greater detail, FIGS. 1-5 illustrate a first embodiment 10 of the two-hand control mechanism of the present invention. Mechanism 10 includes a parallelogram linkage 30 which is moved between rest (FIG. 1) and operational or extended (FIG. 3) positions by a pair of opposing, hand-controlled plungers (FIG. 1) or button mechanisms 55. The linkage 30 engages a slideable plunger or contact 70 (FIG. 1), a contact switch 90 or 100 (FIGS. 1 and 10), or some other device to operate a pneumatic control valve 112 (FIG. 10) or other mechanism such as a press.

As shown best in FIGS. 1–3, the control mechanism 10 includes a rigid metalic housing 12 formed from a block of metal and includes top, bottom, left and right side walls. The block or housing 12 also includes generally planar rear and front surfaces against which are secured similarly shaped, flat metallic plates 18, 20 respectively by securing screws 21 or the like. Cut out from the center of block or housing 12 in the shape of the linkage to be mounted therein is a generally T-shaped opening 22 which extends through the entire block 12. As seen in FIG. 2, the linkage 30 and control plunger mechanisms 55 fit within the width of block 12 intermediate front and rear cover plates 20, 18 when secured on the housing.

Mechanism 10 may be secured with fasteners via apertures 24 in and through the entire block 12 and front and rear cover plates 20, 18 to a press or other machine designed to be controlled by the present invention. Each of the plungers 55 extends through one of the side walls 15, 16 and is pivotally connected to the moveable linkage 30 which extends in opening 22 adjacent the inside surface of rear cover plate 18 as shown in FIG. 2. A guide ramp member 80 controls movement of the free joint 40 of the linkage to and from slideable contact plunger 70. Contact plunger 70 extends through top wall 13 in embodiment 10 of the device for contact with a portion of an electrical contact switch 90 which is also secured on top wall 13 as shown in FIGS. 1 and 3.

As is best seen in FIGS. 1–3, moveable linkage 30 includes a plurality of pivotally connected, rigid links formed in a closed polygon, preferably a parallelogram. The linkage includes four, rigid links 32, 34, 36 and 38, each of which is equal in length. Links 32-38 are preferably formed from sheet metal and are pivotally joined at their ends by pivot studs or other fasteners having parallel pivot axes to form the apexes of the parallelogram, namely, pivot joints 40, 41, 42 and 43.

As shown in FIGS. 1, 2A and 3, the lower most apex or pivotal joint 42 is secured between cover plates 18, 20 by means of a pair of spacer plates 44, 45 which are secured to the inside surfaces of cover plates 18, 20 by machine screws 46, rivots or other fasteners. Pivot joints 41, 43 are respectively joined to separate, hand-controlled mechanisms or plungers 55 for movement and extension of the fourth pivot joint 40 vertically upwardly and downwardly as shown by comparison of FIGS. 1 and 3.

Extending rearwardly from the fourth or free pivot joint 40 is a cam projection or rigid pin 48 (FIGS. 4 and 5) which is generally cylindrical and includes a rounded end and is telescopically, slideably received in a cylindrical opening or recess 49 in the rear facing end of pivot connector 40 joining links 32, 34. Connector 40 includes an enlarged head 50 with a planar surface engaging the inside surface of front cover plate 20 to space the linkage properly therefrom while a biasing, coil spring 52 is received within recess 49 and engages a recess in rigid pin 48 to urge pin 48 outwardly against the inside surface of rear cover 18. The free end joint 40 of linkage 30 is thus spaced between and slides along portions of the front and rear cover plate for proper movement. As explained below, the rounded ends of links 32, 34, which are retained pivotally together by means of connector 40, are designed to engage the planar end of slideable plunger 70 when the linkage is extended by plungers 55 to make contact with contact switch 90 or another apparatus to control the machine.

As shown in FIGS. 1–3, each of the hand-controlled plungers 55 includes a slideable plunger rod 56 having a large diameter portion 56a and a smaller diameter portion 56b. Each of the side walls 15, 16 of housing 12 includes an aperture 57 slideably receiving one of the plungers 55. Apertures 57 include a large diameter portion 57a receiving plunger portion 56a and a smaller diameter portion 57b receiving plunger portion 56b. Telescopically received over plunger portions 56a is a biasing, coil spring 58 which is trapped between the end of plunger portion 56a and the end of aperture portion 57a. These springs 58 bias the plungers 55 outwardly and urge the connected linkage 30 to its rest position as shown in FIG. 1.

Secured to the end of plunger rod portions 56a are pivot connectors 60 having height dimentions greater than the diameters of plunger rod portions 56a. Connectors 60 are secured to rods 56 by threaded connectors 59 received internally of plunger rod portions 56a and connectors 60 as shown in FIG. 2. The increased height of pivot connector 60 forms a stop limiting outward movement of plungers 55 under the influence of biasing springs 58 as will be understood from FIG. 1.

At the inner end of each of the pivot connectors 60 are rigid links 62, 64 each of which has a general H-shape when viewed in cross section (FIG. 2). The internal recesses of links 62, 64 are designed to receive the pivot connectors 60 on the outside and the pairs of pivotally connected links 32, 38 and 34, 36 of linkage 30 on the inside. Connectors 60 are received within the recesses of links 62, 64 and pivotally joined thereto by pivot studs 63, 65, respectively, while pivot studs 41, 43 pivotally interconnect links 34, 36 and 62 and links 32, 38 and 64 respectively. Studs 63, 65 and 41, 43 are retained in place longitudinally by cover plates 18, 20 (see FIG. 2). Accordingly, plunger rods 56, connectors 60, and link members 62, 64 form a pivotal connection to the linkage 30 from each side thereof.

The inner end of one of the plungers 55 is pivotally connected to joint 41 as described above on one side of the moveable linkage 30. The inner end of the other plunger 55 is pivotally connected to joint 43 at the opposite side of the linkage 30. Accordingly, simultaneous depression of plungers 55 laterally compresses that the linkage which, because joint 42 is secured at a fixed location, causes vertical extension of the free pivot joint 40 of the linkage and cam projection or pin 48 upwardly in a vertical direction as shown in FIG. 3. When plungers 55 are released by the operator, biasing springs 58 return the plungers and the linkage 30 to the rest position shown in FIG. 1.

As shown in FIGS. 1, 3, 4 and 5, a slideable plunger pin 70 is mounted in top wall 13 and adapted for an engagement by the ends of pivotally connected links 32, 34. Pin 70 is generally cylindrical and includes an enlarged head 72 on its inner end. The pin is slideably received in an aperture 74 extending through top wall 13, which aperture includes an increased diameter portion 74a at its lower end. A biasing, coil spring 76 is received within large diameter aperture portion 74a and against the inside suface of enlarged head 72 to bias the pin inwardly of the housing 12 and away from switch 90. Spring 76 also helps return linkage 30 to its rest position when pin 70 engages links 32, 34 by urging linkage 30 downwardly. A split connector ring 78 received in a groove at the upper end of pin 70 forms a stop limiting inward movement of the pin under the force of spring 76.

An important part of the control for linkage 30 enabling the linkage to engage slidable pin 70 only when plungers 55 are simultaneously operated is raised, guide ramp member 80 shown in FIGS. 1–5. Ramp member 80 is generally T-shaped when viewed from the front (FIGS. 1 and 3), and includes a planar, inclined surface 82 leading from the lower edge of the longest, downwardly extending leg of the T to a raised, rectilinear, planar surface 83 extending along that longest leg. As shown in FIGS. 4 and 5, when plungers 55 are simultaneously depressed, the free pivot joint 40 of linkage 30 is extended upwardly such that rigid pin 48 engages inclined surface 82 and is depressed inwardly against the force of spring 52. When pin 48 reaches surface 83, the ramp member guides the pin and the linkage in a rectilinear path into engagement with the lower end of pin 70 such that pin 70 is extended for contact with an appropriate control. The side arms 84, 85 of ramp member 80 are provided for stability and fastening purposes to the inside surfaces of rear cover plate 18 as shown in FIGS. 1–5. The upwardly extending side surfaces along surfaces 82, 83 of ramp member 80 effectively prevent engagement of links 32, 34 with slidable pin 70 when plungers 55 are not simultaneously depressed or are depressed sequentially. This is because the linkage moves to one side or the other of ramp member 80 with side surface of the ramp member engaging the sides of pin 48 to prevent the pin from riding up surface 82 to surface 83 thereby preventing contact with the lower end of the pin 70.

As shown in FIGS. 1, 3, 4 and 5, one type of control designed for operation by the mechanism of the present invention is an electrical switch 90 secured on top wall 13 in alignment with pin 70. Switch 90 is supported by a bracket 92 and includes a depressible plunger 93 in alignment with the end of pin 70. When linkage 30 is extended by simultaneous depression of plungers 55, links 32, 34 engage pin 70 and extend it against the force of spring 76. Such extension brings the pin into engagement with plunger 93 which is correspondingly depressed completing a circuit within the switch 90. Of course, switch 90 may be in turn connected to appropriate controls for a press or other machine such as a time relay which could cause only momentary or controlled closing of the press circuitry, or could be directly connected to the press such that the press will operate continuously as long as plunger 93 remains depressed by the two-hand control mechanism. An alternate form of switch as described below at 100 also enables momentary control of a machine.

In a second embodiment 95 of the two-hand mechanical control, like numerals indicate like parts to embodiment 10. The principle difference of embodiment 95 from embodiment 10 is the inclusion of an actuating projection 96 extending outwardly from enlarged head 50 of pivot connector 40 which joins links 32, 34. In this embodiment, the front cover plate of the housing 12 would be removed and the control device secured adjacent a contact switch 100 fastened on a support strut 102 or like adjacent to the control mechanism. Switch 100 is an electrical switch including an extending engagement bar 104 pivotally secured to the lower edge of switch body 101 and extending upwardly at an angle therefrom. Engagement bar 104 rests against a contact plunger 106 which is biased outwardly by a spring within body 101 and is inwardly moveable to make an electrical circuit when engagement bar 104 is forced or pivoted rearwardly.

Engagement bar 104 includes a one-way dog or pivot roller 108 mounted on a pair of parallel, extending arms 110 which themselves are pivotally mounted at the end of bar 104. Arms 110 are prevented from pivoting vertically upwardly beyond the position shown in FIG. 10 by engagement with a support or bar 104. Arms 110 thus maintain their rigid outward extension when they are engaged from below by projection 96 as shown in FIG. 10. However, once cam or projection 96 passes the position of roller 108, bar 104 returns to its original position under the influence of the spring urging plunger 106 outwardly. This breaks the electrical circuit and enables momentary actuation of the machine or valve controlled by the device 95. When projection 96 returns downwardly to its rest position when plungers 55 are released, arms 110 pivot downwardly allowing projection 96 to move therepast without pivoting bar 104 rearwardly or depressing plunger 106. Hence, electrical contact is made only once with hand-control device 95 when plungers 55 are depressed and projection 96 is moved upwardly. Electrical contact is not made on the return stroke of the projection because arms 110 and roller 108 pivot downwardly when engaged by the cam to the position shown in phantom in FIG. 10.

Contact switch 100 is electrically connected to a pneumatic control valve 112 and energized by a line cord 114 adapted for connection to a source of alternating electric current of 110-112 volts. One side 116 of the line cord 114 is connected to one contact of switch 100. The other side 118 of line cord 114 is connected to a solenoid in pilot valve portion 112a of control valve 112. The solenoid is in turn connected to a single light 120 atop valve 112 and to the remaining contact of switch 100. Accordingly, when electrical contact is completed with switch 100, light 120 is illuminated and pilot valve 112 is actuated via its solenoid to allow pressurized air from an inlet (not shown) to flow to a main valve (not shown) and out an outlet (not shown) to a controlled machine.

In yet a third embodiment 120 of the invention, an alternate form of plunger 122 is included to enable horizontal attachment of the main body portion of the control device to a machine or other device. In embodiment 120, where like numerals indicate like parts to embodiments 10 and 95, vertically oriented plunger rod 124 which is received through a plunger guard 126 is pivotally connected to one leg 128a of a bell crank 128 at pivot point 127. The bell crank 128 is pivotally secured to a fixed support 129 on a machine or other device at pivot 130 while its other leg 128b extends to a pivotal connection at 132 with an end of plunger rod 134. Plunger rod 134 includes a large diameter portion 134a received in aperture portion 57a and a smaller diameter rod portion 134b received in smaller diameter aperture 57b in the manner described above in connection with embodiment 10. A coil spring 58 biases plunger 134 outwardly in the same manner as plungers 55. Accordingly, bell crank 128 enables conversion of vertical reciprocal motion from plunger 124 to reciprocal motion of plunger 134 in a perpendicular direction by pivoting around point 130.

The desired safety operation which prevents injury to an operator of the devices 10, 95 or 120 by requiring use of two hands is illustrated in FIGS. 6-9. FIG. 6 illustrates the rest position of the linkage 30 when plungers 55 are not depressed. The linkage may be used for either momentary actuation of a control device when the contact to be engaged by cam or pin 48 is positioned at location 130 between the rest position of cam or pin 48 and the fully extended position of the linkage including cam or pin 48 as it is illustrated in FIG. 3. When plungers 55 are simultaneously depressed (FIG. 7), links 62, 64 are moved inwardly as are joints 41, 43. In addition, joints 41, 43 and links 32-38 are moved upwardly because joint 42 is fixed. This causes cam or pin 48 to move vertically upwardly in a rectilinear path, along guide surfaces 82, 83 of ramp 80, and across position 130 causing momentary engagement of contact switch 100 designed to be located at position 130. Alternately, the vertically upwardly directed motion engages slidable plunger pin 70 which in turn depresses plunger 93 of switch contact 90 for operation of a machine or device.

However, if either the right or left-hand plunger 55 is depressed alone, out of sequence with, or non-simultaneously with the other plunger, cam or pin 48 will be moved to the left or right of position 130 and to the right or left of ramp 80 and thus to one side or the other of roller 108 on switch 100 or slidable pin plunger 70. Thereafter, if the other plunger 55, which had not been previously depressed simultaneously, is then depressed, cam or pin 48 is prevented from being swung over the position 130 because of the upstanding side surfaces of ramp member 80. Thus, operation of the controlled machine with the two-hand control device can only take place when plungers 55 are simultaneously depressed and not if the plungers are sequentially depressed or one plunger is held down while the other is operated. In addition, if one of the plungers 55 is released after both are simultaneously depressed, the linkage 30 will move to the left or right, as shown in FIGS. 8 and 9, causing cam or pin 48 to slide off surface 83 of ramp 80 requiring complete release of both plungers 55 before the pin or cam 48 can be repositioned on surface 83 via inclined surface 82. The above result is obtained regardless of whether the contact member 70 or 108 is positioned at the position represented by point 130 in FIGS. 6-9 or at the full extension of the linkage at the position of pin 70 to provide either momentary or continuous operation of the control device. The ramp member 80 and cam or pin 48 thus effectively prevent engagement of the links 32, 34 with pin 70 or projection 96 with roller 108 unless the plungers are simultaneously depressed.

With the present invention, depression of two opposing plungers 55 simultaneously is required in order to operate a controlled machine regardless of whether that machine is to be momentarily or continuously operated. In addition, even if the control mechanism is initially operated with two hands, operation of the controlled machine will cease if the operator removes one of his hands from the present invented controlled device. Such removal will allow the cam or pin 48 to fall away from the position of contact member 70 preventing continued operation of the machine. Thus, the safety objective of the invention is maintained even when the device is used to control continuous operation of a press or other machine because removal of one of the operator's hands will cause the machine to stop.

As will be apparent to those skilled in the art, the lengths of the opposed pairs of links in linkage 30 may be varied as long as the lengths of links 32 and 34, or 36 and 38, or 62 and 64 are maintained of equivalent length. Such dimensional requirements will insure that the free pivot joint 40 and cam or pin 48 are moved rectilinearly when plunger buttons 55 are simultaneously depressed.

In addition, a pneumatic valve having a moveable plunger or contact for engagement with the cam or pin 48 could be substituted for the plunger pin 70, and contact switch 90 or contact switch 100 for ultimate control of another machine.

While several embodiments of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A two-hand control mechanism for controlling the operation of a device such as a machine comprising:
   a linkage including a plurality of pivotally connected links forming a closed polygon, one pivot joint of said linkage being secured at a first, fixed position;
   a first, hand-controlled means pivotally connected to said linkage at a second position spaced from said first, fixed position on one side of said linkage for moving said one side of said linkage;
   a second, hand-controlled means pivotally connected to said linkage at a third position spaced from said first, fixed position to the side of said linkage opposite said one side for moving the opposite side of said linkage;
   engaging means at a moveable pivot joint at a fourth position of said linkage opposite said fixed joint and intermediate said sides of said linkage for engaging a contact adjacent said linkage to initiate operation of a device such as a machine; and
   said hand-controlled means being operable simultaneously to move said linkage between rest and operated positions; said engaging means adapted to engage the contact only when said first and second hand-controlled means are operated simultaneously to move said linkage.

2. The two-hand control mechanism of claim 1 including guide means for controlling movement of said engaging means to and from the contact and for preventing engagement of said engaging means with the contact when only one of said hand-controlled means is operated and when said hand-controlled means are not operated simultaneously.

3. The two-hand control mechanism of claim 2 wherein said guide means includes a raised member extending along a path of movement of said engaging means which is adapted to guide said engaging means to the contact.

4. The two-hand control mechanism of claim 3 wherein said raised member is a ramp member having an inclined surface leading to a raised, rectilinear surface and side surfaces, said raised, rectilinear surface adapted to lead to a contact, said side surfaces preventing said engaging means from moving along said path of movement to the contact except when said hand-controlled means are operated simultaneously and said engaging means follows said inclined surface.

5. The two-hand control mechanism of claim 4 wherein said ramp member is generally T-shaped, said inclined surface being at the free end of the longest leg of the T-shaped, ramp member.

6. The two-hand control mechanism of claim 1 including means for guiding movement of said engaging means along a rectilinear path when said hand-controlled means are operated simultaneously.

7. The two-hand control mechanism of claim 1 wherein said linkage includes four pivotally connected links of equivalent length, said links being arranged in a parallelogram; said hand-controlled means connected at opposed, side pivot joints of said linkage; said fixed, first position being a pivot joint intermediate said side pivot joints; said engaging means including a cam secured to the remaining pivot joint.

8. The two-hand control mechanism of claim 1 wherein said links extending between said first and second and said first and third positions are equivalent in length; said links extending between said second and fourth and said third and fourth positions also being equivalent in length.

9. The two-hand control mechanism of claim 1 wherein each of said first and second hand-controlled means includes a slidably movable plunger, a rigid connector extending and pivotally connected between said plunger and one of said second and third linkage positions, means for guiding sliding movement of said plunger, and biasing means for urging said linkage to said rest position.

10. The two-hand control mechanism of claims 1 or 2 wherein said engaging means is a rigid pin extending outwardly from the pivot joint of said linkage at said fourth position.

11. The two-hand control mechanism of claim 10 including means for slideably mounting said rigid pin at said fourth position and biasing means for urging said rigid pin outwardly of said fourth position on said linkage.

12. The two-hand control mechanism of claim 1 including a rigid housing for supporting and enclosing said mechanism, said housing including side, rear, front, top and bottom walls forming an enclosure, said first and second hand-controlled means being secured to opposing side walls, said fixed pivot joint of said linkage being secured between said front and rear walls with said engaging means being moveable parallel to said rear wall when said hand-controlled means are operated.

13. The two-hand control mechanism of claim 12 including contact means adjacent said linkage and adapted for engagement by said engaging means for initiating operation of a device such as a machine.

14. The two-hand control of claim 13 wherein said contact means includes a slideable plunger mounted on said housing in alignment with said engaging means, said plunger including biasing means for biasing said plunger toward said engaging means.

15. The two-hand control mechanism of claim 12 wherein said moveable pivot joint at said fourth position includes means slideably engaging and confined between said front and rear walls of said housing for guidance of said moveable pivot joint.

16. A two-hand, non-tie down, control mechanism for controlling operation of a device such as a machine comprising:
   a linkage support;
   a moveable parallelogram control linkage having at least four rigid links pivotally connected one to another at at least four pivot joints, opposing pairs of said pivot joints being aligned with one another, one of said pivot joints in one of said opposing pairs being fixed to said linkage support, said linkage being moveable between rest and operated positions;

a pair of hand-controlled plungers adapted to be operated to move said linkage, one plunger pivotally connected to one pivot joint of the other of said opposing pairs of pivot joints, the other plunger pivotally connected to the other pivot joint of said other pair of pivot joints;

biasing means for returning said plungers and said linkage to said rest position when said plungers are released;

engaging means at the fourth and remaining pivot joint for engaging a contact adjacent said control linkage for initiating operation of a device such as a machine when said plungers are operated simultaneously and said linkage is moved.

17. The two-hand control mechanism of claim 16 including guide means for allowing movement of said engaging means to and from the contact and for preventing engagement of said engaging means with the contact when only one of said hand-controlled means is operated and when said hand-controlled means are not operated simultaneously.

18. The two-hand control mechanism of claim 17 wherein said guide means is a raised ramp member having an inclined surface leading to a raised, rectilinear surface and side surfaces for a preventing movement of said engaging means to said raised surface except along said inclined surface.

19. The two-hand control mechanism of claim 16 wherein said four links are equal in length to one another and the pivot axes of said pivot joints are parallel to each other.

20. The two-hand control mechanism of claim 16 wherein said engaging means include a rigid pin biased outwardly of said linkage at said fourth position.

21. The two-hand control mechanism of claim 16 including contact means adjacent said linkage and adapted for engagement by said engaging means for initiating operation of a device such as a machine.

22. The two-hand control mechanism of claim 21 wherein said contact means includes a slideable plunger mounted on said housing in alignment with said engaging means, said plunger including biasing means for biasing said plunger toward said engaging means; and an electrical switch having a moveable connection means for engagement with said slideable plunger.

23. The two-hand control mechanism of claim 21 wherein said contact means includes an electrical switch having a moveable connection for engagement with said engaging means, said moveable connection including means for momentarily establishing a closed circuit when engaged by said engaging means when said hand-controlled plungers are operated simultaneously but not when said hand controlled plungers are released.

* * * * *

UNITED STATES PATENT AND TRADEMARK OFFICE
CERTIFICATE OF CORRECTION

PATENT NO. : 4,252,228
DATED : February 24, 1981
INVENTOR(S) : Robert D. White

It is certified that error appears in the above—identified patent and that said Letters Patent is hereby corrected as shown below:

Column 3, line 22:

"point" should be --- pivot ---.

Signed and Sealed this

Eighteenth Day of August 1981

[SEAL]

Attest:

GERALD J. MOSSINGHOFF

Attesting Officer     Commissioner of Patents and Trademarks